United States Patent [19]
Roth et al.

[11] Patent Number: 6,152,297
[45] Date of Patent: *Nov. 28, 2000

[54] MEDIA DISK STORAGE CONTAINER WITH SPINE COVER

[75] Inventors: Richard Roth; William L. Plumb, both of New York, N.Y.

[73] Assignee: Q2 Marketing, LLC, Great Neck, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/293,870

[22] Filed: Apr. 19, 1999

[51] Int. Cl.⁷ .................................................. B65D 85/57
[52] U.S. Cl. ..................... 206/308.1; 206/308.2; 206/232
[58] Field of Search ................. 206/308.2, 232; 307/308.1, 309, 310, 311, 312, 313, 389.1, 387.11, 387.13, 472, 807; 220/831–835, 796

[56] References Cited

U.S. PATENT DOCUMENTS

| | | |
|---|---|---|
| 5,267,647 | 12/1993 | Stumpff et al. ................. 206/308.1 |
| 5,477,961 | 12/1995 | Taniyama .......................... 206/308.1 |
| 5,551,559 | 9/1996 | Roth et al. ........................ 206/308.1 |
| 5,746,314 | 5/1998 | Knutsen et al. .................. 206/308.1 |
| 5,850,912 | 12/1998 | Ganser et al. .................... 206/308.1 |
| 5,878,879 | 3/1999 | Liao .................................. 206/308.1 |
| 5,896,455 | 4/1999 | Biedebach et al. .............. 206/308.1 |
| 5,971,143 | 10/1999 | Yoshioka .......................... 206/308.1 |

FOREIGN PATENT DOCUMENTS

88/06559  9/1988  WIPO ................................ 206/308.1

*Primary Examiner*—Luan K. Bui
*Attorney, Agent, or Firm*—Ostrolenk, Faber, Gerb & Soffen, LLP

[57] ABSTRACT

A media disk storage container formed of a lid pivotally connected to a base, the base being provided with a spine having a customized cover for identifying the media contents of the container, the artist, the recording company, the manufacturer of the container or other information. The spine cover preferably snaps into place over the spine.

7 Claims, 2 Drawing Sheets

6,152,297

MEDIA DISK STORAGE CONTAINER WITH SPINE COVER

BACKGROUND OF THE INVENTION

1. Field of the Invention

The present invention relates to a media disk storage container and, more particularly, to a hinged media disk storage container provided with a cover for the spine of container. The spine cover includes indicia which identify the media contents of the container, the artist, the recording company, the manufacturer or other information. The container is particularly suited for, but not limited to, the storage of compact audio/video disks, CD-ROM's and other laser-readable disks.

2. Description of the Related Art

Media disk storage containers having hinged lids and printed paperboard labels are disclosed in several U.S. patents which are commonly assigned with the present application, as follows: U.S. Pat. No. 5,284,242, issued Feb. 8, 1994; U.S. Pat. No. 5,377,827, issued Jan. 3, 1995; U.S. Pat. No. 5,462,159, issued Oct. 31, 1995; U.S. Pat. No. 5,551,559, issued Sep. 3, 1996; U.S. Pat. No. Des. 393,394, issued Apr. 14, 1998; U.S. Pat. No. Des. 395,190, issued Jun. 16, 1998; and pending U.S. design patent application Ser. No. 29/041,663, filed Jul. 20, 1995, the disclosures of which are incorporated herein by reference.

The above patents represent advancements beyond the typical "jewel box" used to contain compact disks, such as disclosed in U.S. Pat. No. 4,874,085, which is formed of clear plastic so that printed promotional material inserted inside the lid and the base is visible to the consumer. The assembled jewel box is then wrapped in a plastic film.

Another example of a prior art disk storage container is U.S. Pat. No. 5,188,230.

All of the above-described disk storage containers include a lid pivotally connected to a base provided with a spine. To date, the spine, about which the lid pivots, is typically formed of patterned plastic, is integral with the base, and has not been used to identify the contents of the container, the artist, the recording company, the manufacturer or other information. It would be desirable to be able to customize the container by providing a spine cover which can be customized.

SUMMARY OF THE INVENTION

The present invention provides an improved media disk storage container formed of a lid pivotally connected to a base, the base being provided with a spine cover which can be customized to identify the contents of the container, the manufacturer or other information. The spine cover preferably snaps into place over the spine. The spine cover is provided with various features, such as colors, patterns, lettering, insignia, etc. which may identify the media disk or disks packaged within the container, the artist of the media disk, the manufacturer or other information.

The customizable spine cover of the present invention is applicable to any media disk storage container, such as those disclosed and claimed in the patents noted above, including those assigned to the assignee of the present invention, which are typically provided with a plurality of paperboard inserts secured to the inner and outer surfaces of the lid and base (as disclosed, for example, in the container of U.S. Pat. No. 5,551,559).

Other features and advantages of the present invention will become apparent from the following description of the invention which refers to the accompanying drawings.

DETAILED DESCRIPTION OF THE PREFERRED EMBODIMENTS

Figure 1:
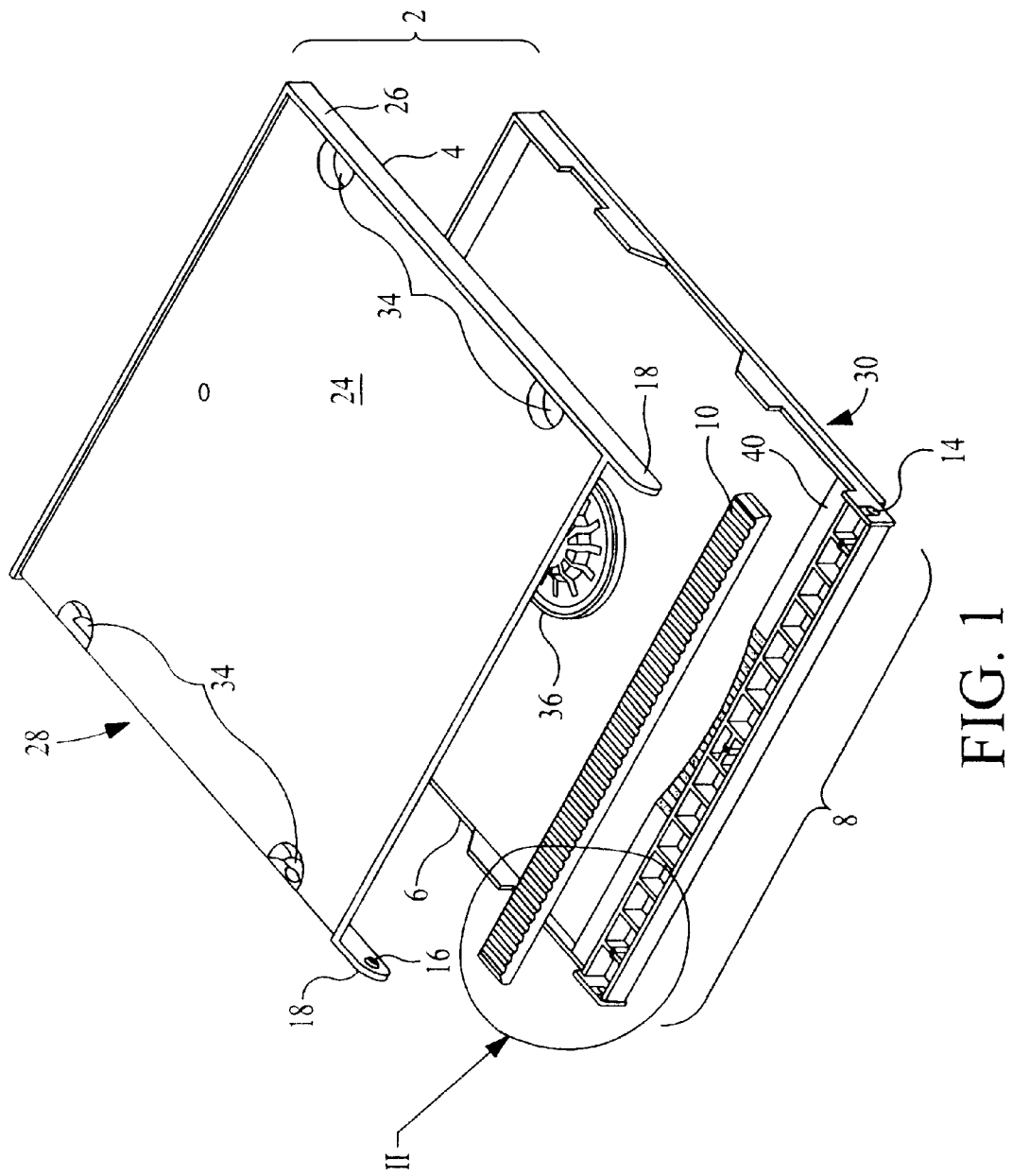
FIG. 1 shows a media disk storage container according to a preferred embodiment of the present invention.

Referring initially to FIG. 1, a preferred media disk storage container 2 according to the present invention is shown in an exploded view. Container 2 has a lid 4 and a base 6. When the container is assembled, the lid 4 pivots on a hinge with respect to the base 6 to form a closeable box, as described in more detail below.

Base 6 is provided with a spine 8 along the side of the container where the hinge is located. A spine cover 10 snaps into place over spine 8. The cover 10 can be provided with various patterns and indicia which serve to identify the media contents of the container, the artist of the media contents, the recording company, the manufacturer or other information.

Preferably, the container hinge is formed by apertures 14 located in opposing ends of the spine 8. The apertures 14 receive pins 16 formed on the lid 4. The pins 16 are located on an inside surface of legs 18 which extend from the sides of the lid 4. The two legs 18 extend away from the lid and along opposed ends of spine 8, such that when the container is closed, the outer suface of lid 4 and cover 10 together form a front surface of the container.

Figure 2:
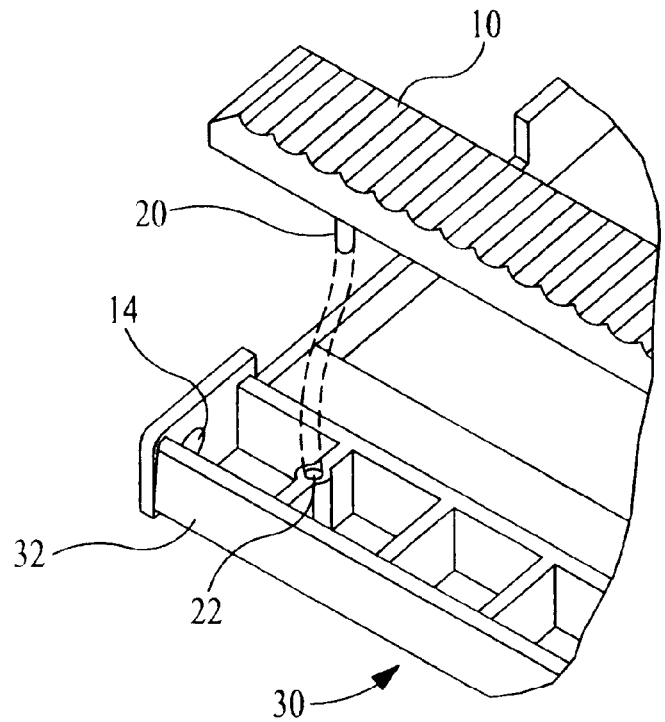
FIG. 2 is an exploded detail of section II of the media disk storage container shown in FIG. 1.
Figure 3:
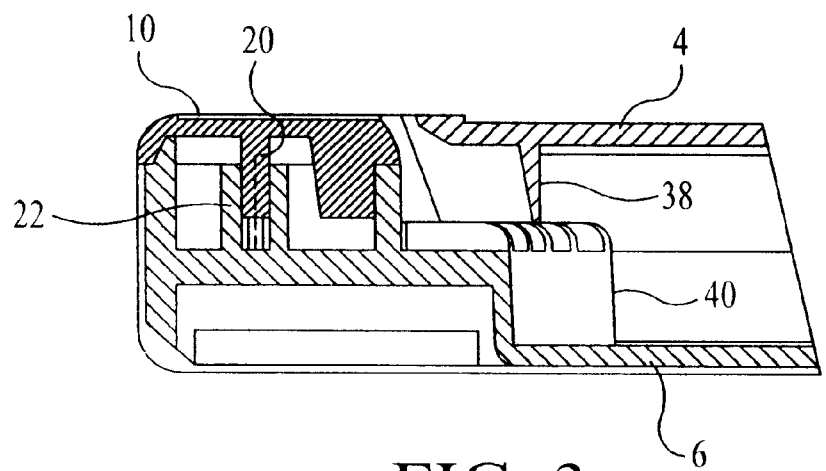
FIG. 3 is a partial cross-sectional view of the container of FIG. 1, the container having been assembled and shown with the lid closed.

Referring to FIGS. 2 and 3, cover 10 is provided with pins 20 which engage sockets 22 formed along the spine 8. Significantly, the cover 10 is formed as a separate piece, so that it can be handled individually during manufacture.

Advantageously, cover 10 can be provided during the manufacturing process with characteristic patterns, colors, insignia, lettering, etc. which distinguish the media on the media disk, the artist, the recording company or other information.

Referring again to FIG. 1, the container 2 of the preferred embodiment of the present invention will be described, in which printed paperboard labels are applied to the surfaces of the lid and base to provide further identifying indicia of the contents of the container.

More specifically, lid 4 has a recessed outer surface 24, and a sidewall 26 which extends at least partially around the periphery of the lid. Outer surface 24 is recessed with respect to a peripheral edge of the sidewall. A top portion of the sidewall 28 also has a recessed section which is continuous with the recessed outer surface 24.

A corresponding paperboard label (not shown) is received in the recessed sections of the lid, so that a major portion of the paperboard label is received within the recessed outer surface 24, and an extension or flap of the label wraps around the side of the container and is received in recessed sidewall 28.

The base has a similar construction to the lid for receiving another paperboard label. Accordingly, an outer surface 30 of the base has a recess which is continuous with a recess 32 along the side of spine 8. A corresponding base label (not shown) is received in the recessed sections of the base, so that a major portion of the label is received by the recessed outer surface 30 of the base, and an extension or flap of the label wraps around the side of spine 8 and is received in recessed endwall 32.

In addition, lid 4 is provided with tabs 34 located adjacent the inner surface of the lid for securing a document or other labelling to be enclosed within the container. Tabs 34 can be seen through half-round openings in the lid in the perspective view of FIG. 1. Further, labels can be received on the inner surface of the lid and/or the inner surface of the base, underneath the media disk, for example, as desired.

Additional features include a spindle 36 which secures a media disk within the container, and an anti-theft device can be concealed within a recess in the container and is covered by an overlying label, as described in the prior patents of the present assignee referenced previously above.

The container also is preferably provided with various supports which prevent damage to the container when the lid and base are compressed together. For example, referring to FIG. 3, a support wall 38 engages ledge 40 and prevents excessive compression of the lid. Other support devices are provided along the edges of the base and the lid, for example.

The container also can be provided with interlocking tabs to hold the base and lid together when the container is closed, as well as grasping means located advantageously on both the first and second peripheral walls, for example, so that a user can grasp the base and lid when opening or closing the container.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A media disk storage container, comprising:

a lid having an outer surface and a sidewall extending at least partially around a periphery of the lid, the outer surface of the lid being recessed with respect to a peripheral edge of the sidewall and the sidewall having a recessed section which is continuous with the recess on the outer surface of the lid, a corresponding lid label being received in the recessed sections of the lid;

a base including a spine and having an outer surface, and a sidewall extending at least partially around a periphery of the base;

a hinge connecting the lid and the base together; and a separate spine cover disposed on the spine;

wherein the lid and the spine cover together form a front surface of the container when the lid is closed, and wherein the spine cover is provided with identifying information concerning the media disk.

2. The container of claim 1, wherein the spine is recessed, and a base label is mounted on the outer surface of the base, the base label including a flap which extends from the outer surface of the base and wraps around and into the spine recess.

3. The container of claim 1, wherein the lid includes a recessed section along an upper side of the sidewall, and the lid label includes a corresponding top flap which extends from the outer surface of the lid, wraps around the upper side of the sidewall and into the recessed section.

4. The container of claim 1, further comprising means located on an inner surface of the lid for securing literature to be included in the container.

5. The container of claim 1, further comprising at least one spindle for securing a media disk within the container.

6. The container of claim 1, further comprising an anti-theft device concealed within the container.

7. The container of claim 1, further comprising support means located on the inner surface of the base for preventing damage to the container when the lid and base are compressed together.

* * * * *